Figure 1:
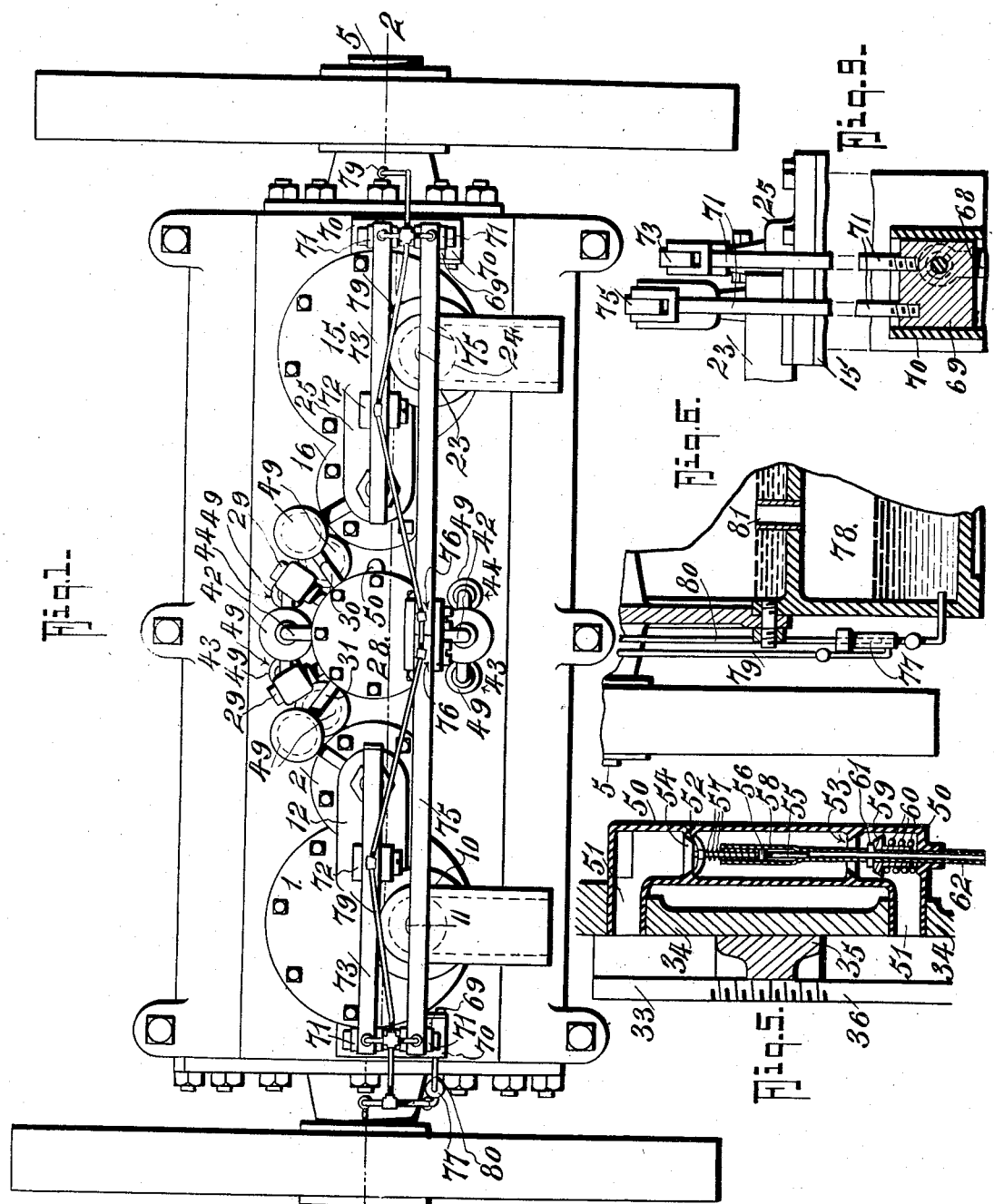

W. J. WRIGHT.
COMBINED INTERNAL COMBUSTION AND HOT AIR ENGINE.
APPLICATION FILED APR. 3, 1911.

1,097,068.

Patented May 19, 1914.

4 SHEETS—SHEET 3.

WITNESSES:
John J. Schrott
Charles H. Wagner

INVENTOR
William J. Wright
BY
Fred G. Dieterich
ATTORNEYS.

W. J. WRIGHT.
COMBINED INTERNAL COMBUSTION AND HOT AIR ENGINE.
APPLICATION FILED APR. 3, 1911.
1,097,068.
Patented May 19, 1914.
4 SHEETS—SHEET 4.
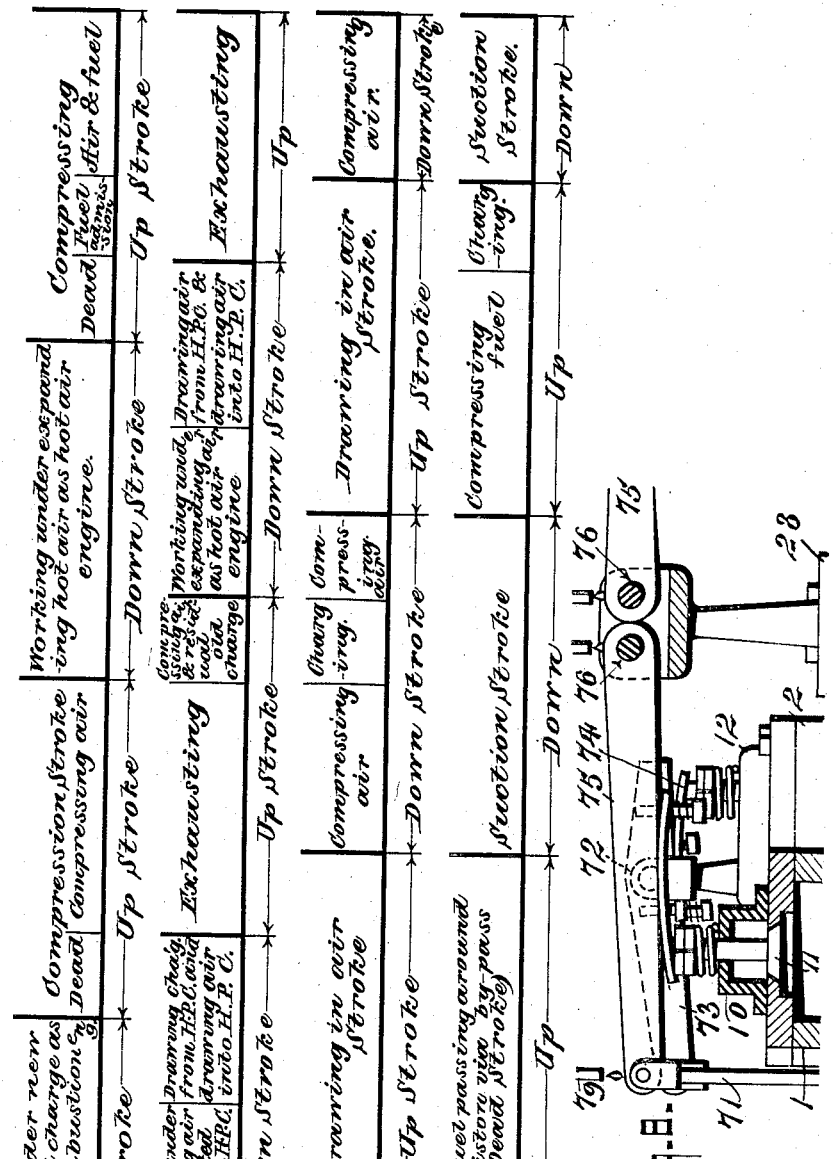

UNITED STATES PATENT OFFICE.

WILLIAM J. WRIGHT, OF FRANKLIN, PENNSYLVANIA, ASSIGNOR TO WRIGHT ENGINE COMPANY, OF PITTSBURGH, PENNSYLVANIA, A CORPORATION OF DELAWARE.

COMBINED INTERNAL-COMBUSTION AND HOT-AIR ENGINE.

1,097,068.        Specification of Letters Patent.        Patented May 19, 1914.

Application filed April 3, 1911. Serial No. 618,637.

*To all whom it may concern:*

Be it known that I, WILLIAM J. WRIGHT, residing at Franklin, in the county of Venango and State of Pennsylvania, have invented certain new and useful Improvements in Combined Internal-Combustion and Hot-Air Engines, of which the following is a specification.

The present invention relates to internal combustion engines of the compound type and it employs a high pressure cylinder and its piston, operating generally on the four-cycle principle, while still obtaining two working impulses in each cycle; a low pressure cylinder and its piston also operating on the four-cycle principle, obtaining two working impulses to each cycle of operation; a fuel charging pump; an air charging pump; and the necessary valves and valve gear, ports, etc., to effect the required operation.

The invention also includes a method and means for drawing the heat out of the cylinder walls, utilizing the expansive force thereof in performing work on both pistons during a part of their cycles of operation, thus enabling much of the energy that is lost in other types of engines in the shape of heat, to be conserved as well as effectively cooling the cylinders, and thus enabling a higher initial compression to be applied without danger of premature explosion.

Again, it is the object of my invention to provide means whereby a maximum initial density of the new mixture may be obtained prior to ignition, so that the initial pressure of the fired mixture will rise to a maximum; in other words, by combining pressure and simultaneously cooling the new charge and the cylinder walls, a maximum density of working agent is obtained whereby the force of expansion when ignition takes place will be considerably greater than has heretofore been found possible in engines of the internal combustion type. Furthermore the heat of combustion being diffused throughout the cylinder walls, and its energy lost by radiation and conduction, the heat is drawn out of the cylinder walls, by the air charge, thereby causing the air to expand and do work. The engine operates during one part of its cycle as an internal combustion engine, and during another part of its cycle as a heat engine, thus utilizing the advantages of both types while obviating their disadvantages.

The invention also includes an improved method of operating an internal combustion engine whereby the heat that is usually wasted is employed to do work, thus avoiding the necessity of providing cooling jackets to convey away the heat, and on the other hand, conserving a large part of the heat energy and making it do work on the pistons during a part of their cycle of movement.

The invention further has for its object to cause the heated air to act not only on the low pressure pistons, but also on the high pressure piston during a part of the cycle of operation and without admitting a new charge of fuel into the cylinder.

Another object of my invention is to admit the fuel into the high pressure cylinder intermediate the ends of the working chamber during the time the high pressure piston is moving on its up stroke to compress the contents of the high pressure cylinder ahead of it, and while the high pressure cylinder contains fresh air, thereby causing the fuel to enter the cylinder between two strata of air as it were, the air serving to draw the heat from the cylinder walls and piston head and impart some of it to the fuel charge. This keeps the high pressure cylinder as cool as possible, enables a longer stroke to be employed and permits a high initial compression to be given to the charge without premature firing thereof, than is possible with the ordinary types of engine.

Figure 2:
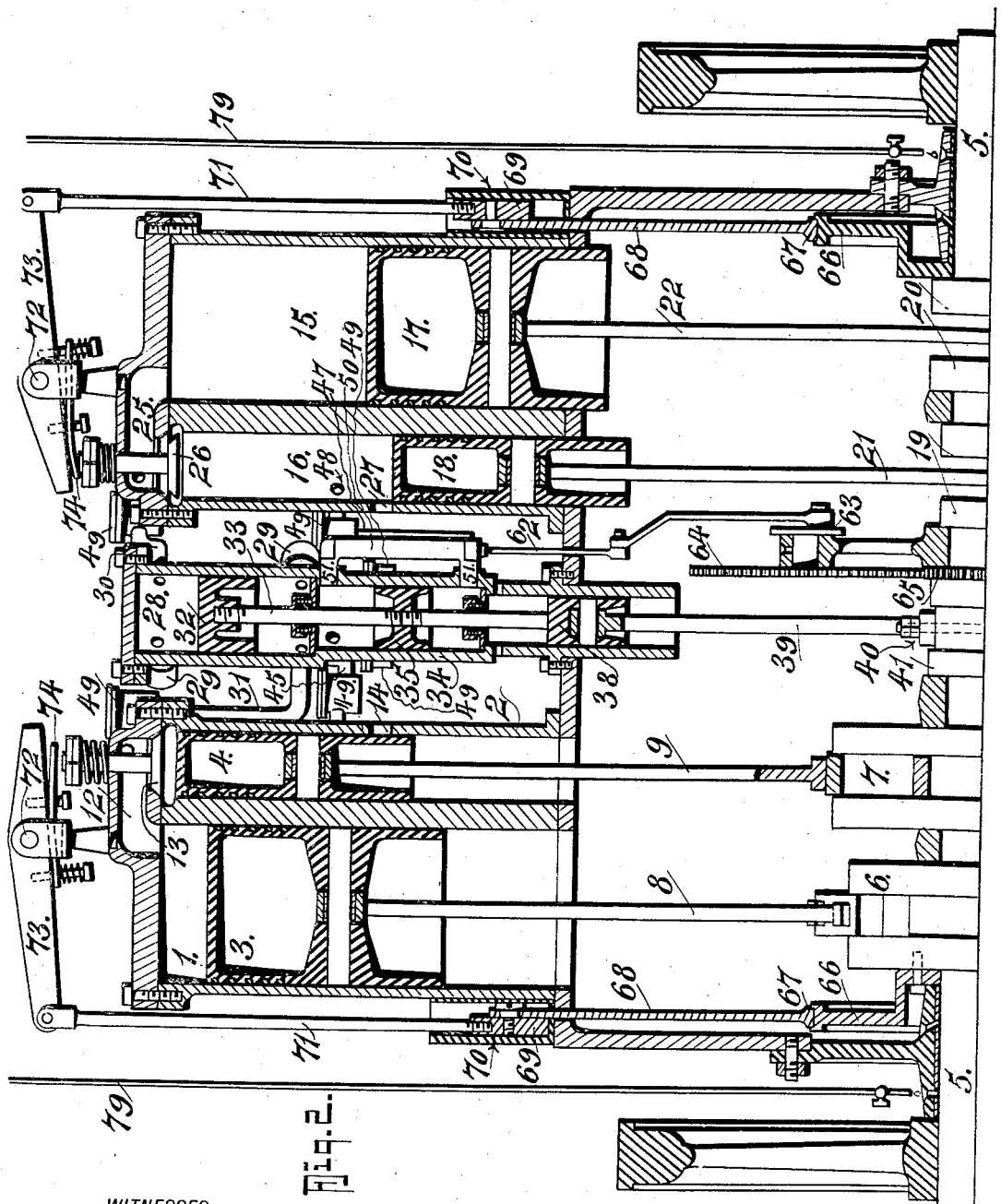
Figure 3:
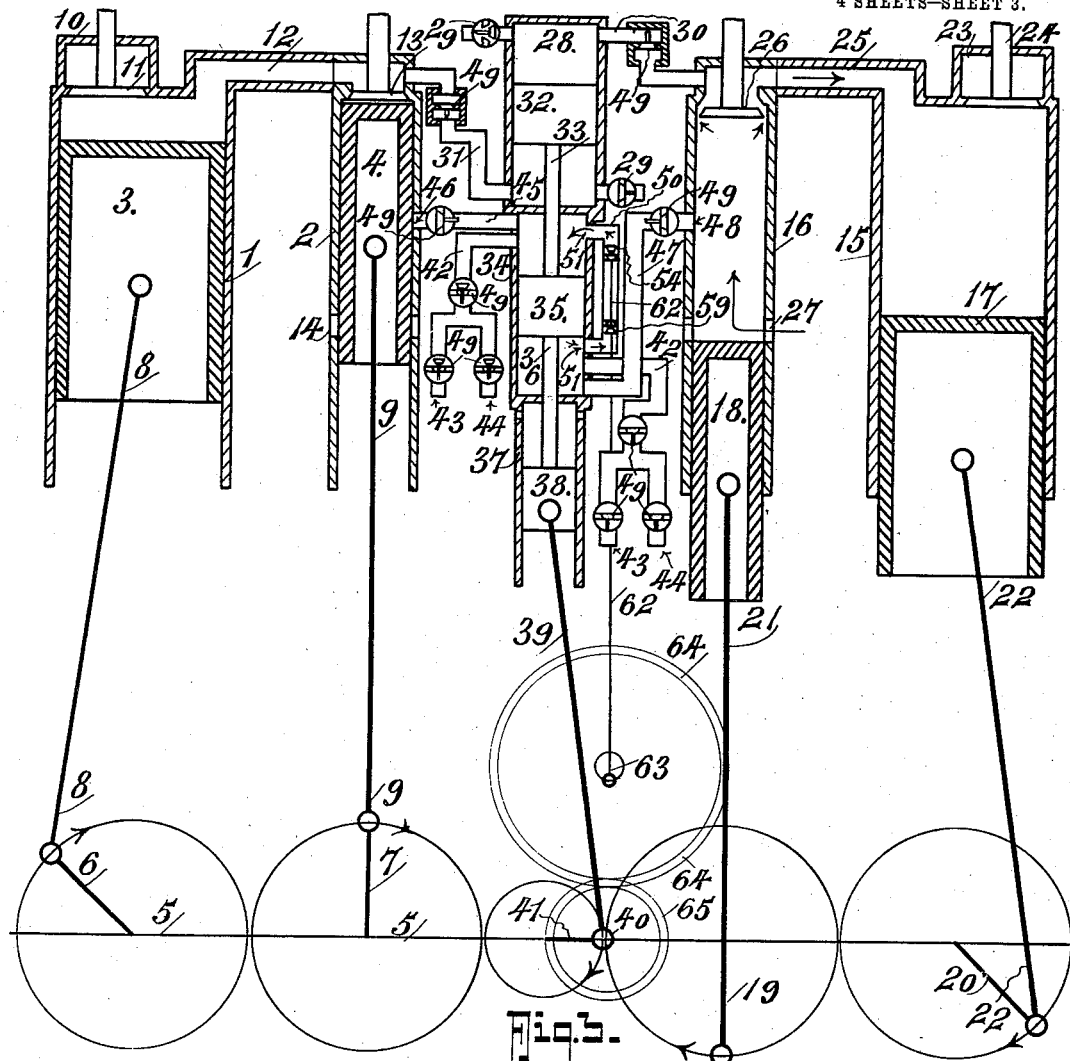
Figure 4:
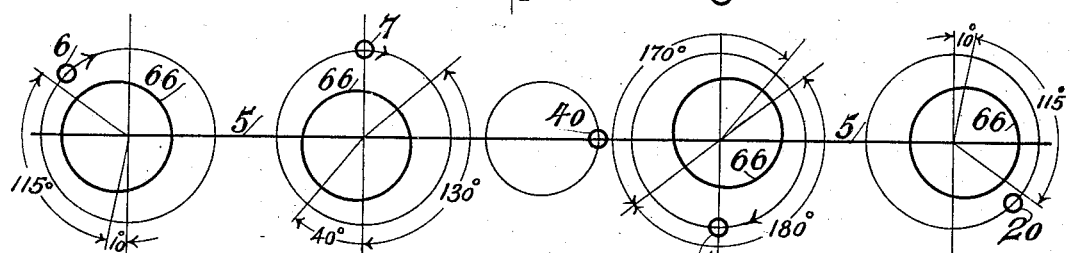

My invention also includes those novel details of construction, combination and arrangement of parts, all of which will be first fully described, then specifically pointed out in the appended claims, and illustrated in the accompanying drawings, in which:

Figure 1, is a top plan view of my engine composed of a double unit. Fig. 2, is a vertical longitudinal section on the line 2—2 of Fig. 1. Fig. 3, is a diagrammatic view of the same. Fig. 4, is a diagrammatic view of the various positions of the valve actuating cam when the respective valves are open. Fig. 5, is an enlarged detail section of the by-pass valve and the duct of the fuel pump. Fig. 6, is a detail view of the oiling system and oil pump. Fig. 7, is a diagrammatic view indicating the cycles of operation of the high pressure piston, the low pressure piston, the air pump piston, and the fuel pump. Fig. 8 is a detail side elevation and part section hereinafter referred to. Fig. 9 is a detail elevation of a portion of the invention.

Referring now to the accompanying drawings, in which like letters and numerals of reference indicate like parts in all of the figures, 1 and 15 are the low pressure cylinders in which the low pressure pistons 3 and 17 respectively, operate. The high pressure cylinders 2 and 16 contain the high pressure pistons 4 and 18 respectively.

5 is the crank shaft which is common to all of the pistons and has cranks 6, 7, 19 and 20, to which the connecting rods 8, 9, 21 and 22 to the pistons 3, 4, 18 and 17, respectively are joined.

10 and 23 designate the exhaust ports of the low pressure cylinders 1 and 15 respectively and the exhaust ports 10 and 23 respectively are controlled by exhaust valves 11 and 24 respectively. See Figs. 1, 4 and 8.

13 and 26 designate the valves in the by-passes 12 and 25 in the cylinders 1 and 2 and 16 and 15 respectively, the valves 13 and 26 being in the head of the cylinders 2 and 16 respectively.

The high pressure cylinders 2 and 16 have piston controlled air inlet ports 14 and 27 respectively that are opened when the pistons 4 and 18 respectively are at the lowermost limit of their strokes. At the upper end the pump 28 has a duct 30 that communicates with the duct 25 at the end nearest the high pressure cylinder 16, the duct 30 having a back check valve 49, as indicated. The lower end of the pump 28 is in communication with the duct 12 between the cylinders 1 and 2, through a duct 31 that enters the duct 12 over the high pressure cylinder 2 and contains a back check valve 49. Thus the pump 28 serves to supply air to the low pressure cylinders 1 and 15, through the ducts 12 and 25, and operable, as will later be described.

The pump 28 includes the piston 32 that is double acting and has its rod 33 projected into the fuel pump casing 34 and joined to the fuel piston 35, which is in turn connected by a rod 36 with a cross head 38 which is driven by a crank 41 on the shaft 5, to which a connecting rod 39 is joined at 40. A charge of air and gas is admitted to each end of the cylinder 34 of the fuel pump through ducts 42 in which are back check valves 49, and the ducts 42 communicate with the air and gas inlet ducts 43 and 44 respectively through valve laterals, as indicated in Fig. 3 of the drawings. Fuel is conveyed from the upper end of the cylinder 34 to the high pressure cylinder 2, through a piston-controlled port 46 with which the ducts 45 communicate, a back check valve 49 being provided in the duct 45. The lower end of the pump 34 communicates with the high pressure cylinder 16, at its port 48 through the medium of a duct 47 in which is a back check valve 49, for the usual purpose.

In my present engine, the pump 35 operates to inject fuel into the high pressure cylinders on alternate strokes of the same, that is, once in every other stroke, and as the pump piston 35 makes one stroke for each stroke of the pistons 4 and 18, it is necessary that the charge be shifted from one end of the pump cylinder to the other, on alternate strokes so as not to force the fuel into the high pressure cylinders except on alternate strokes. I have therefore provided a by-pass duct 50 which communicates at 51 with the respective ends of the cylinder 34 and contains two valve seats 52 and 53 respectively, which are closed by the valves 54 and 59 respectively. The valves 54 and 59 are controlled by a valve actuating rod 62 on which the valves 54 and 59 have loose engagement. The valve 54 has its stem 55 projected into a socket 58 of the rod 52 and is held normally closed by a spring 57 that engages a spider in the duct 50 and a collar 56 on the stem 55. The valve 59 is normally closed by the spring 60 and is opened by a projection or collar 61 on the rod 62 that engages the valve 59 at intervals, the shoulders of the socket 58 engaging the collar 56 of the valve 54 to open it on the up-stroke of the rod 62 while the collar 61 opens the valve 59 on its down stroke. The rod 62 is reciprocated once to every two reciprocations of the piston 35 by a two to one gear connection 64—65 with the shaft 5, the gear 64 carrying a crank 63 to which the rod 62 is connected as shown.

66 are the cams that operate the valves 11 and 13, there being one cam for each set of valves 11 and 13. The cams 66 are so set that the valve 11 will commence to open after the piston 3 has started on its up stroke a distance of about 10°, the valve remaining open about the distance of 115. The valve 13 opens on the down stroke of the piston 4 after it has gone about 50° on such down stroke and remains open until the piston 4 goes on its up stroke the distance of about 40°, more or less. The valve 26 operates in the same manner as the valve 13, and the valve 24 operates in the same manner as the valve 11, the difference being that the opening of the valve 26 occurs 180° after the valve 13 opens and the valve 24 opens 180° after the valve 11 opens and vice versa. In other words the operation of the valves 13 and 26 and 11 and 24 are 180° apart.

67 designates the cam engaging portions of the valve actuating rods 68 which join to the cross heads 69 in the slide 70, the cross heads being connected by rods 71 to the rocker arms 73 and 75 that are pivoted at 72 and 76 respectively to uprights on the cylinder head, the rocker arms 73 and 75 being provided with "hushers" or noise-preventing devices 74.

77 designates an oil pump whose piston is connected by a rod 80 to the crosshead 69 or other reciprocating part of the machine and the pump 77 conveys oil from the reservoir 78 to the piping 79 that distributes the oil to bearings as indicated, the reservoir 78 receiving the overflow oil from the crank case through overflow pipe 81.

Having thus described the construction of my engine, the method of operating the same will be best explained by reference to Figs. 3 and 7. Assume the parts to be in positions as indicated in Fig. 3. There will be a charge of cold air in the cylinder 1 ahead of the piston 3 which is about to be forced in by the piston 32, via ducts 31 and 12 over the cylinder head 2. The incoming air draws the heat out of the walls of the cylinder 2 and the walls of the cylinder 1, and the air thus becomes somewhat warm as it is forced into the cylinder 1, so that on the down stroke of the piston its expansive force may be utilized. There will be a charge of compressed new fuel mixture and air in the cylinder 2 ahead of the piston 4 which is just about to begin its down stroke and the charge ahead of it is just about to be ignited. The piston 17 will be moving on its down stroke, the valve 24 closed, the valve 26 open, and the piston 17 is drawing the old charge of exploded working agent from the cylinder 16 into the cylinder 15, via the duct 25, and at the same time drawing cold air into the cylinder 16 through the port 27. Now as the piston 4 moves on the down stroke it will move under the influence of the exploded new charge in the cylinder 2 until it reaches the ports 14, at which time the exploded charge will be at approximately atmospheric pressure. As soon as the piston 3 has completed its up stroke and started on its down stroke the expanding air will exert a pressure against the piston to move it on its down stroke, and after it begins to move on its down stroke the expanding air will be reinforced by the charge panding air will be reinforced by the charge from the cylinder 2, which will be admitted into the cylinder 1 after the piston 4 has moved down about 45 or 50 degrees, at which time, the valve 13 will open so that both cylinders 1 and 2 will be thrown into communication and both pistons 4 and 3 will be impelled together for a distance of about 90° more or less until the piston 4 begins to open the ports 14, at which time the remaining portion of the down stroke of the piston 3 is utilized to draw the old charge of burnt fuel from the cylinder 2 via duct 12 into cylinder 1, and at the same time draw air into the cylinder 2 through the ports 14. The valve 13 remains open until the piston 4 starts on its up stroke and covers the ports 14, after which the valve 13 closes. The piston 4 on its up stroke then compresses the charge of air which has been drawn in through the ports 14. The piston 3 on its up stroke exhausts the old charge through the port 10, the valve 11 starting to open just after the piston starts on its up stroke, and remains open until the piston has passed through about 115 or 120 degrees on its up-stroke, or in other words, until it arrives at the position shown in Fig. 3, at which time the valve 11 closes, and at this time also, the air from the pump 28 is ejected through the duct 31 into the duct 12 and into the cylinder 1, the air entering until a balance of pressure in the duct 12 and the pump 28 is reached, at which time the back check valve 49 in the duct 31 closes, and the remaining part of the up-stroke of the piston 3 is utilized to compress this air charge. The pump 32 forces air into the cylinder 1 on each down stroke of the piston 32, as described. Now, as the piston 4 has completed its up-stroke it will move downwardly under the influence of the compressed charge of air drawn in through the ports 14 which has taken up the heat of the walls of the cylinder 2 and thus expanded exerting a force on the piston 4 which now operates as a hot air engine. As the piston 3 reaches the limit of its up-stroke and starts on its down stroke it will operate as a hot air engine under the expansive force of the air pumped in by the pump 32 and heated in passing over the head of the cylinder 2. After the piston 4 has moved on its down stroke a distance of about 45 or 50 degrees, the valve 13 again opens and the cylinders 1 and 2 are again thrown into communication, thus allowing both pistons 3 and 4 to operate through a further distance of 90° together as hot air engine pistons under the influence of the expanding air that is within the cylinders and has drawn the heat out of the cylinder walls. As the piston 4 opens the ports 14 the piston 3 will again draw the contents of the cylinder 2 through the duct 12 into the cylinder 1 and draw air into the cylinder 2 through the ports 14. After the piston 4 has closed the ports 14 on its second up-stroke it will compress the air in the cylinder 2; the valve 13 will close and the piston 3 in starting on its up-stroke will exhaust the said air from the cylinder 1 through the port 10, the valve 11 being open. After the piston 4 has closed the ports 14 on its second up stroke the fuel charging pump 35 will force a charge of fuel through the duct 45 into the cylinder 2, ahead of the piston 4, which charge of fuel plus the air in the cylinder 2 will be com- pressed during the remaining portion of the up-stroke of the piston 4. After the piston 3 has moved up the required distance and exhausted the old air charge, the pump 32 will again pump a charge of fresh air through the duct 12 into the cylinder 1, further cooling the explosion chamber end of the cylinder 2 in which the new charge is being compressed and conveying the heat into the cylinder 1, where the air is compressed during the remaining part of the up-stroke of the piston 3. As the piston 4 reaches the limit of its up-stroke and starts on its down stroke, the new charge will be ignited, and thus the foregoing cycle of operation will be completed.

The operation of the pistons 18 and 17 is identical with that of the pistons 4 and 3, excepting that the operations take place 180° later. By particular reference to Fig. 7, it will be observed that the cycle of operation of the high pressure piston is as follows: Commencing the cycle with the high pressure cylinder filled with a compressed charge of fuel ready to be ignited and the high pressure piston to begin its down stroke. During the down stroke of the high pressure piston it will operate as an internal combustion engine under the influence of the ignited new charge. On its first up-stroke it will serve to compress the air that has been drawn into the high pressure cylinder. On its second down stroke it will operate as a hot air engine, under the influence of the expanding heated air, (the air having been warmed by the heat drawn out of the cylinder walls) and on its second up stroke it serves to compress the air that has been drawn into the cylinder plus the new charge of fuel that has been pumped into the cylinder by the fuel pump. The cycle of operation of the low pressure piston begins 45° after the beginning of the cycle of the high pressure piston. During the first half of its down stroke it works under the influence of the expanding old air charge plus the exploded charge of the high pressure cylinder, when the cylinders 1 and 2 are in communication with the duct 12. During the second half of its down stroke, the low pressure piston draws the spent charge from the high pressure cylinder into the low pressure cylinder and draws air into the high pressure cylinder through the piston-controlled ports of the same; during three fourths of the up-stroke of the low pressure piston, it exhausts the old charge in the low pressure cylinder and during the remaining part of the up-stroke it compresses the residual charge of air plus the air that is pumped into it, via the duct 12 from the air pump. During the second down stroke of the low pressure cylinder it works first under the influence of the expanding air charge, as a hot air engine, and secondly, it draws the air from the high pressure cylinder into the low pressure cylinder and draws air into the high pressure cylinder through the piston-controlled ports of the same. During the first part of the second up-stroke of the low pressure piston it exhausts the supply of air, and during the second part of the up-stroke it compresses the old residual air charge plus the new charge of air pumped into the cylinder by the air pump. From the foregoing, it will be seen that on every other down stroke of the high pressure piston, it operates as an internal combustion engine, and on the other down strokes it operates as a hot air engine. Similarly the low pressure piston on alternate down strokes operates under the influence of exploded new charge, as an internal combustion engine, as it were, and on the other down strokes it operates as a hot air engine under the influence of the expanding air. It will therefore be seen that I have provided a four-cycle compound engine in which each of the pistons operate under the four-stroke cycle, but I obtain a working impulse on each down stroke, one of the impulses being given when the piston is working as an internal combustion engine, and the other impulse being given when the piston is working as a hot air engine, thus obtaining the benefits of a two-cycle engine in a four-cycle engine.

In this application I have disclosed no particular type of ignition system, as any of the approved types now well known in the art, may be employed; either a hot tube or electric ignition, as conditions make desirable, the only requirement being that the ignition system be timed to ignite the new charges in the high pressure cylinders at the proper intervals, a thing that can be readily done by mere mechanical adjustment of the present ignition systems to my engine, and I therefore do not think it necessary to disclose any ignition system.

From the foregoing description taken in connection with the accompanying drawings, it is thought the complete construction, operation and advantages of my invention will be readily understood by those skilled in the art to which the invention appertains, and I desire it understood that slight changes in the operation and arrangement of the parts may be made. In other words, the cranks may not be set 45° apart, they may be set at 35°, or 50° apart, or other slight variations of like nature may be readily made without departing from the spirit of the invention, or the scope of the appended claims.

What I claim is:—

1. The method of operating compound engines of the type described, having a high and low pressure cylinder and their pistons, which consists in impelling the high pressure piston on alternate working strokes by an ignited charge of air and gas fuel, impelling said high pressure piston on the other working strokes by expanding air, operating said high pressure piston on alternate compression strokes to compress air in the high pressure cylinder and on the other compression strokes to compress air and fuel mixture in said high pressure cylinder, said method consisting further in acting on the low pressure piston to perform its cycle of operations a predetermined number of degrees behind the high pressure piston, said method further consists in throwing the high and low pressure cylinders into communication at the regular intervals to permit both pistons to be impelled by the same working agent during a coördinate part of their working strokes.

2. The method of operating combined internal combustion and hot air engines of the compound type having high and low pressure cylinders and pistons, which consists in throwing the two cylinders into communication at regular intervals and operating the low pressure piston to withdraw a spent charge from the high pressure cylinder twice during each cycle of operation of the pistons and simultaneously draw air into the high pressure cylinder; and which consists further in operating said high pressure piston to move on its compression stroke to compress the contents of the high pressure cylinder; and which consists in admitting a charge of fuel into the high pressure cylinder during alternate compression strokes of the high pressure piston.

3. The method of operating combined internal combustion and hot air engines of the compound type having high and low pressure cylinders and pistons, which consists in throwing the two cylinders into communication at regular intervals and operating the low pressure piston to withdraw a spent charge from the high pressure cylinder twice during each cycle of operation of the pistons and simultaneously draw air into the high pressure cylinder; and which consists further in operating said high pressure piston to move on its compression stroke to compress the contents of the high pressure cylinder; and which consists in admitting a charge of fuel into the high pressure cylinder during alternate compression strokes of the high pressure piston, and which consists further in impelling, by a common working charge in both cylinders, both pistons simultaneously during a common part of their cycle of movement.

4. The method of operating combined internal combustion and hot air engines of the compound type having high and low pressure cylinders and pistons, which consists in throwing the two cylinders into communication at regular intervals and operating the low pressure piston to withdraw a spent charge from the high pressure cylinder twice during each cycle of operation of the pistons and simultaneously draw air into the high pressure cylinder; and which consists further in operating said high pressure piston to move on its compression stroke to compress the contents of the high pressure cylinder; and which consists in admitting a charge of fuel into the high pressure cylinder during alternate compression strokes of the high pressure piston, and which consists further in impelling, by a common working charge in both cylinders, both pistons to cause them to move together during a common part of their cycle of movement, and which consists further in forcing air into the low pressure cylinder during the exhausting strokes of the low pressure piston and operating the low pressure piston to compress such air.

5. The method of operating combined internal combustion and hot air engines of the compound type having high and low pressure cylinders and pistons, which consists in throwing the two cylinders into communication at regular intervals and operating the low pressure piston to withdraw a spent charge from the high pressure cylinder twice during each cycle of operation of the pistons and simultaneously draw air into the high pressure cylinder; and which consists further in moving said high pressure cylinder on a compression stroke to compress the contents of said high pressure cylinder; and which consists in admitting a charge of fuel into the high pressure cylinder during alternate compression strokes of the high pressure piston, and consists further in forcing air into the low pressure cylinder during each exhausting stroke of the low pressure piston to draw out the heat from the cylinder walls, and consists further in operating said low pressure piston to compress such air in the low pressure cylinder.

6. The method of operating engines of the type described, which consists in taking a high pressure cylinder and its piston and a low pressure cylinder and its piston, and operating on the high pressure piston to cause it to undergo the following cycle of operation, to wit:—on one down stroke operating said high pressure piston to work under an ignited charge of air and gas; on the first up stroke thereafter, operating said high pressure piston to compress a charge of fresh air into said high pressure cylinder; on the next down stroke operating said high pressure piston to act as a hot air engine under the influence of the expanding air; and on the next up stroke operating said high pressure piston to compress a charge of fresh air, and then forcing fuel gas into said high pressure cylinder, and subsequently operating said high pressure piston to also compress the gas; said method consisting further in putting said low pressure piston through the following cycle of operations, commencing a predetermined period after the beginning of the cycle of the high pressure piston to wit:—on the first part of its down stroke operating said high pressure piston to act under an expanding old air charge and residual exploded mixture admitted from the high pressure cylinder, and on the last part of its down stroke, operating said high pressure piston to draw the spent charge from the high pressure cylinder into the low pressure cylinder and simultaneously supply the high pressure cylinder with fresh air, then operating the low pressure piston on its first up stroke to exhaust a predetermined part of the low pressure cylinder contents to atmosphere and compress the remainder in the low pressure cylinder, and on the first part of the second down stroke, cause said low pressure piston to operate under the influence of the expanding residual charge and the charge of hot air from the high pressure cylinder, and on the last part of its second down stroke causing said low pressure piston to operate to draw the contents of the high pressure cylinder into the low pressure cylinder, and recharge the high pressure cylinder with fresh air; and on its second up stroke causing said low pressure piston to operate to exhaust a predetermined part of the contents of the low pressure cylinder to atmosphere and compress the remainder.

7. The method of operating engines of the type described, which consists in taking a high pressure cylinder and its piston and a low pressure cylinder and its piston, and putting the high pressure piston through the following cycle of operation, to wit:—on one down stroke operating said high pressure piston to work under an ignited charge of air and gas; on the first up stroke thereafter, operating said high pressure piston to compress a charge of fresh air into said high pressure cylinder; on the next down stroke operating said high pressure piston to act as a hot air engine under the influence of the expanding air; and on the next up stroke operating said high pressure piston to compress a charge of fresh air, and after forcing fuel gas into said high pressure cylinder and moving said high pressure piston to also compress the same; said method consists further in putting said low pressure piston through the following cycle of operations, commencing a predetermined period after the beginning of the cycle of the high pressure piston to wit:—on the first part of its down stroke operating said high pressure piston to act under an expanding old air charge and residual exploded mixture admitted from the high pressure cylinder and on the last part of its down stroke, moving said high pressure piston to draw the spent charge from the high pressure cylinder into the low pressure cylinder and simultaneously supply the high pressure cylinder with fresh air; then moving the low pressure piston on its first up stroke to exhaust a predetermined part of the low pressure cylinder contents to atmosphere and compress the remainder in the low pressure cylinder; and on the first part of the second down stroke moving said low pressure piston by the expanding residual charge and the charge of hot air from the high pressure cylinder, and moving said low pressure piston on the last part of its second down stroke to draw the contents of the high pressure cylinder into the low pressure cylinder, and recharge the high pressure cylinder with fresh air, and moving said low pressure piston on its second up stroke to exhaust a predetermined part of the contents of the low pressure cylinder to atmosphere and compress the remainder; said method consisting further in conveying air into the low pressure cylinder during the compressing portion of the up strokes of the low pressure piston.

8. In an engine of the class described, a high pressure cylinder and its piston, a low pressure piston and its cylinder; a crank shaft to which said pistons are connected, one to move in advance of the other; said high pressure cylinder having air inlet ports; said low pressure cylinder having an exhaust port; an exhaust valve controlling said exhaust port; an intercommunicating duct connecting said cylinders; a valve in said duct; an air pump; a duct between said pump and said intercommunicating duct; means for operating said pump in time to force air through said ducts into said low pressure cylinder during the up stroke of said low pressure piston; said pistons moving down in unison during a part of their downstroke; means for holding said intercommunicating valve open during the common portion of the down stroke of said pistons and the remaining portion of the down stroke of said low pressure piston, to throw both cylinders into communication; said low pressure piston operating to draw the contents of said high pressure cylinder into said low pressure cylinder and replace the same with air before said intercommunicating valve closes and after said air inlet ports are open; means for opening said exhaust valve as said low pressure piston moves on its up stroke to exhaust the contents of the low pressure cylinder to atmosphere and again closing said exhaust valve before said low pressure piston completes its up stroke, thereby causing said low pressure piston during the remaining portion of its up stroke to compress the residual contents of the low pressure cylinder; and means for forcing fuel into said high pressure cylinder during alternate up strokes of said high pressure piston to be compressed thereby; and means for igniting said fuel after compression.

9. In an engine of the class described, a double unit consisting of two sets of high and low pressure cylinders and their pistons, a common crank to which all of said pistons are connected, the high pressure pistons operating in advance of the corresponding low pressure pistons, an intercommunicating duct between the respective high and low pressure cylinders, a valve for each intercommunicating duct, an exhaust port for each low pressure cylinder and an exhaust valve for controlling each exhaust port, a common air pump for forcing air into the intercommunicating ducts of the respective units during each up stroke of the respective low pressure pistons and a common fuel pump for forcing fuel into the high pressure cylinders and including means for rendering said fuel pump inoperative during the alternate up or compression strokes of the respective high pressure pistons to cause said fuel pump to inject fuel into the high pressure cylinders on alternate compression strokes of the respective high pressure pistons, valve gear for actuating said exhaust valve to hold the same open during a predetermined part of the exhausting stroke of the low pressure pistons and hold said exhaust valves closed while said air pump is forcing air into said low pressure cylinders, and a valve gear for operating valves to hold the same open during the down stroke of the low pressure pistons, said high pressure cylinders having piston controlled air inlet ports opening as said high pressure pistons reach the lowest limit of their strokes while said intercommunicating valves are open.

10. In an internal combustion engine, high and low pressure cylinders and their pistons, means coöperative therewith for admitting air and gas fuel charges into said high pressure cylinder on alternate working strokes, means for igniting said charges to impel said high pressure piston, means for admitting air into said high pressure cylinder on the other working strokes to take up the heat of the cylinder walls and piston and on expanding impel said high pressure piston, said high pressure piston operating on alternate compression strokes to compress the air in the high pressure cylinder and on the other compression strokes compress the air and fuel mixture in said high pressure cylinder, means connecting said pistons to cause said low pressure piston to perform its cycle of operations a predetermined number of degrees behind the high pressure piston, means for throwing the high and low pressure pistons into communication at regular intervals to permit both pistons to be impelled by the same working agent during a coördinate part of their working strokes.

11. A combined internal combustion and hot air engine of the compound type, said engine including high and low pressure cylinders and their pistons, a crank shaft, connecting rods between said pistons and crank shaft, said low pressure piston being connected to the crank shaft to perform its cycle of operation a predetermined number of degrees behind the high pressure piston, means for opening up communication between the two cylinders at regular intervals to permit the low pressure piston to withdraw a spent charge from the high pressure cylinder twice during each cycle of the operation of the pistons and simultaneously draw air into the high pressure cylinder, said high pressure piston operating on its compression strokes to compress the contents of said high pressure cylinder, and means for admitting a charge of fuel into the high pressure cylinder during alternate compression strokes of the high pressure piston.

12. A combined internal combustion and hot air engine of the compound type, said engine including high and low pressure cylinders and their pistons, a crank shaft, connecting rods between said pistons and crank shaft, said low pressure piston being connected to the crank shaft to perform its cycle of operation a predetermined number of degrees behind the high pressure piston, means for opening up communication between the two cylinders at regular intervals to permit the low pressure piston to withdraw a spent charge from the high pressure cylinder twice during each cycle of the operation of the pistons and simultaneously draw air into the high pressure cylinder, said high pressure piston operating on its compression strokes to compress the contents of said high pressure cylinder, and means for admitting a charge of fuel into the high pressure cylinder during alternate compression strokes of the high pressure piston, said means that throws the two cylinders into communication at times, also operating to throw said cylinders into communication at predetermined times to cause both pistons to be impelled by a common working charge in both cylinders, during the common part of their cycle of operations.

13. A combined internal combustion and hot air engine of the compound type, said engine including high and low pressure cylinders and their pistons, a crank shaft, connecting rods between said pistons and crank shaft, said low pressure piston being connected to the crank shaft to perform its cycle of operation a predetermined number of degrees behind the high pressure piston, means for opening up communication between the two cylinders at regular intervals to permit the low pressure piston to withdraw a spent charge from the high pressure cylinder twice during each cycle of the operation of the pistons and simultaneously draw air into the high pressure cylinder, said high pressure piston operating on its compression strokes to compress the contents of said high pressure cylinder, and means for admitting a charge of fuel into the high pressure cylinder during alternate compression strokes of the high pressure piston, said means that throws the two cylinders into communication at times, also operating to throw said cylinders into communication at predetermined times to cause both pistons to be impelled by a common working charge in both cylinders, during the common part of their cycle of operations, and means for forcing air into the low pressure cylinder during the exhausting strokes of the low pressure piston to be compressed by said low pressure piston on its compression stroke.

WM. J. WRIGHT.

Witnesses:
  FRED G. DIETERICH,
  ALBERT E. DIETERICH.